Figure 5:
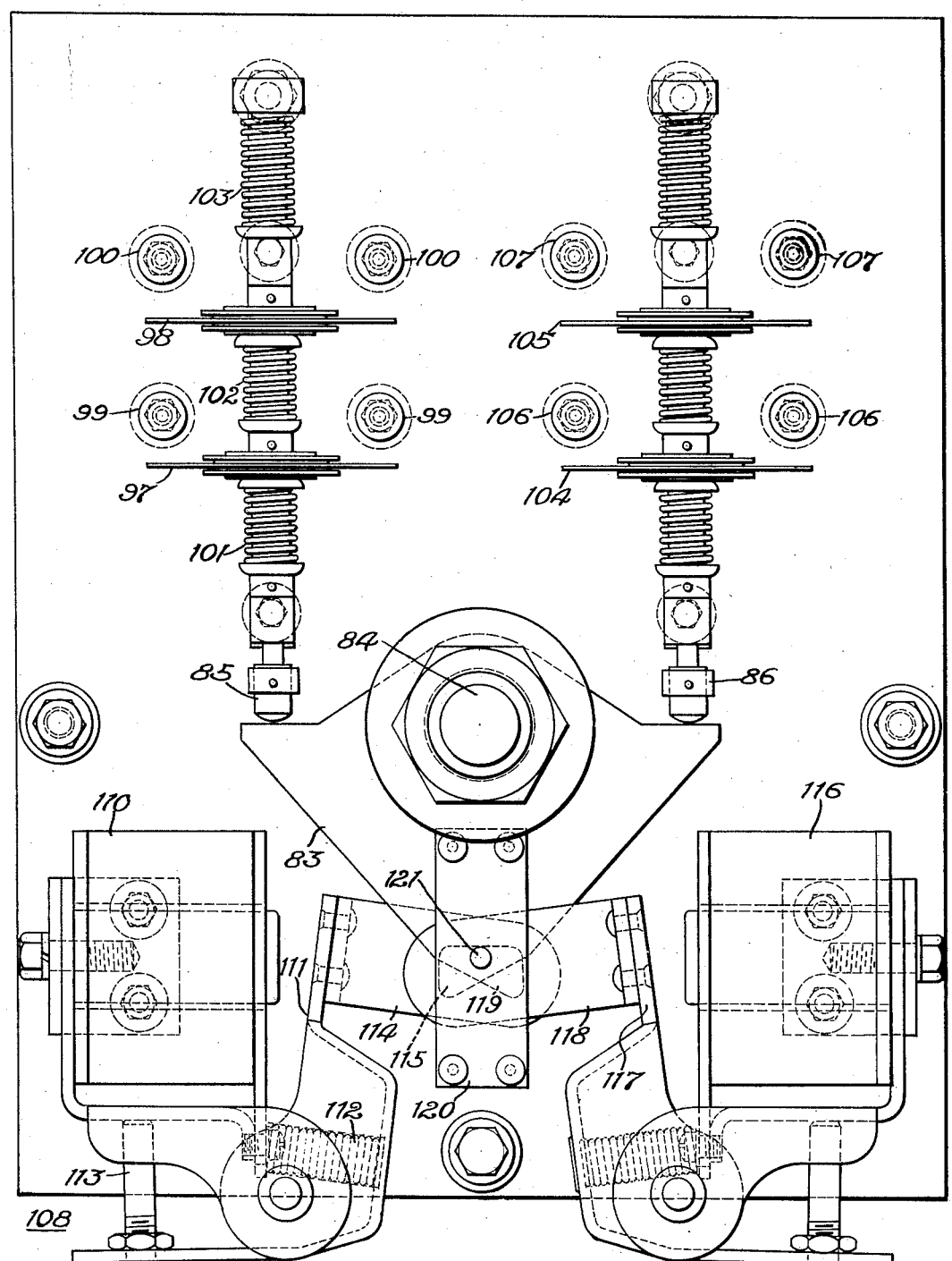

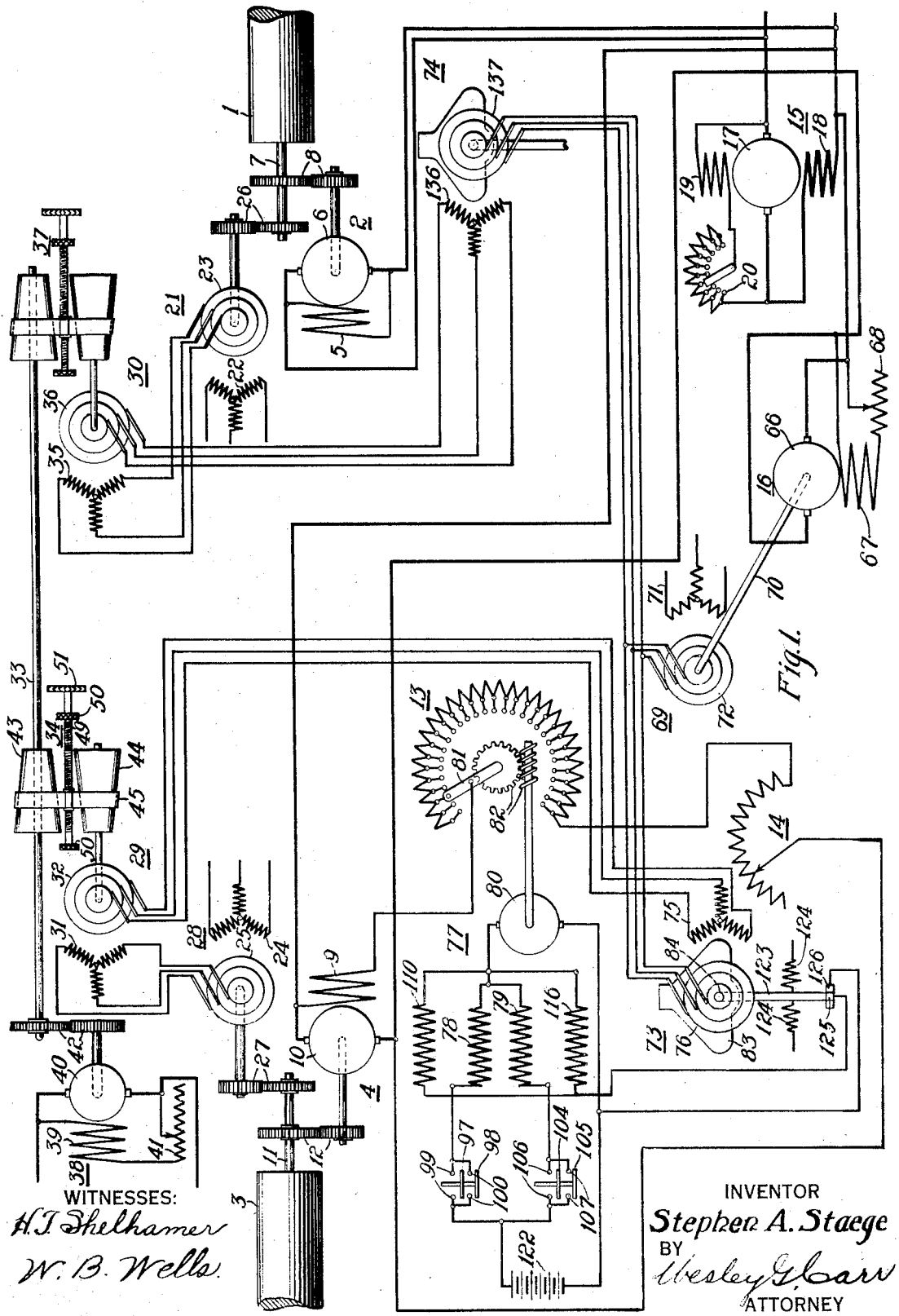

Sept. 15, 1925.　　　　　　　　　　　　　　　　　　　1,553,408
S. A. STAEGE
SPEED REGULATOR SYSTEM
Filed Jan. 12, 1920　　　3 Sheets-Sheet 2
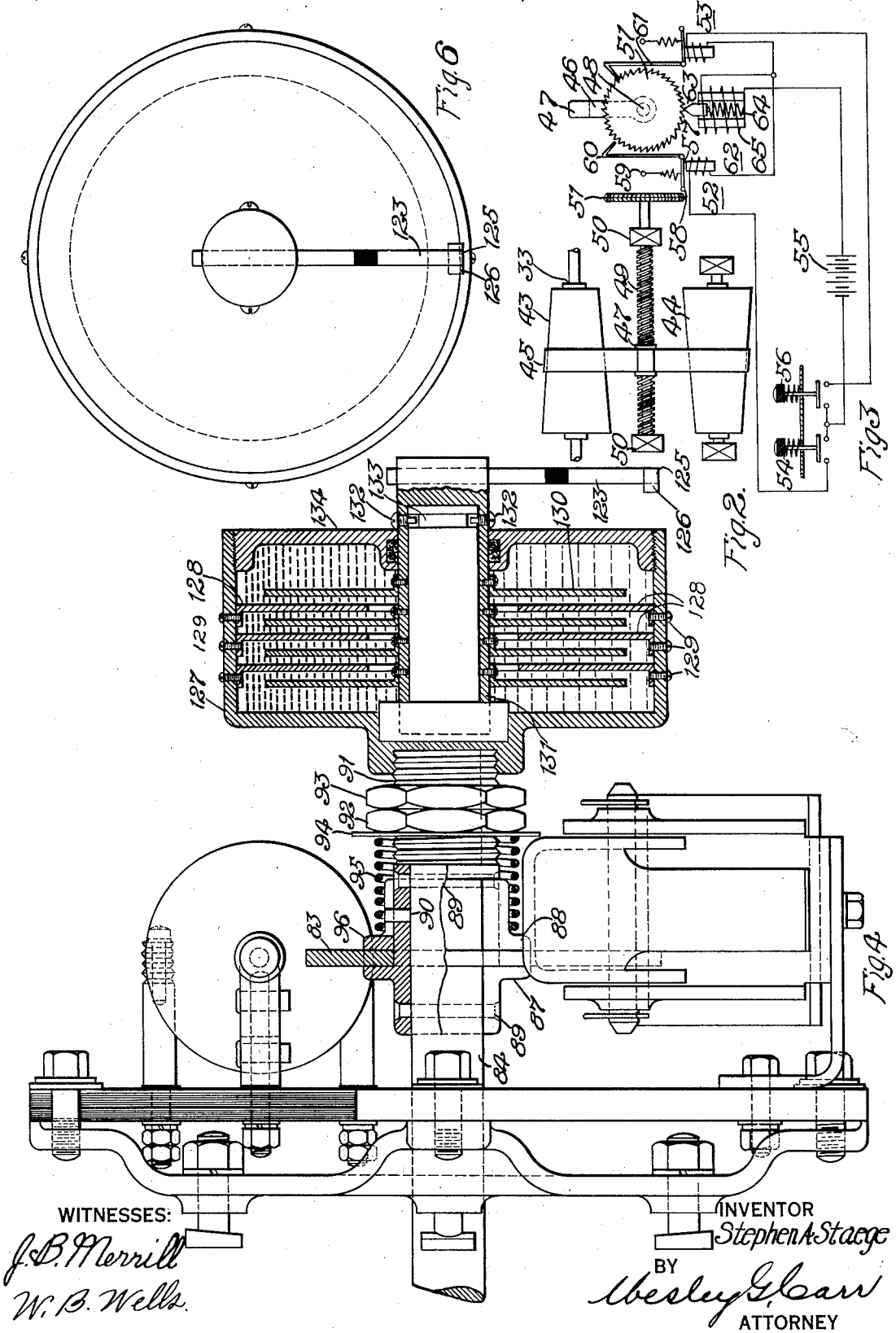
WITNESSES:
J. B. Merrill
W. B. Wells.
INVENTOR
Stephen A. Staege
BY
Wesley G. Carr
ATTORNEY Patented Sept. 15, 1925.

1,553,408

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed January 12, 1920. Serial No. 350,846.

*To all whom it may concern:*

Be it known that I, STEPHEN A. STAEGE, a citizen of the United States, and a resident of Pittsburgh, in the county of Allegheny and State of Pennsylvania, have invented a new and useful Improvement in Speed-Regulator Systems, of which the following is a specification.

My invention relates to speed-regulator systems and particularly to speed-regulator systems for maintaining a constant speed ratio between a number of moving parts.

One object of my invention is to provide a regulator system that shall so operate a number of rotating members as to maintain a constant speed ratio between them; that shall permit a variation, at will, of the speed ratio between the rotating members and that shall govern the speed of each rotating member in an efficient manner and without hunting action.

At the present time, many manufacturing operations require a number of units to be operated at the same speed or at the same relative speeds. Thus, in a paper mill, it is necessary to maintain a constant speed ratio between the sets of rolls through which the paper is passing; also, in a steel mill where an ingot is being rolled into billets by a continuous process, it is necessary to operate the sets of rolls at a constant speed ratio.

In a speed-regulator system constructed in accordance with my invention, a propelling motor is provided for each set of rolls and the excitation of each propelling motor is governed to control the speed of the associated set of rolls. The excitation of the propelling motors is controlled by a plurality of members which are operated at a constant speed ratio in any convenient manner.

In the preferred form of practicing my invention, a frequency changer is operated by each set of rolls and it serves to energize one of a plurality of auxiliary frequency changers in accordance with the speed of the associated set of rolls. The auxiliary frequency changers are operated, in any suitable manner, by a single rotating member in order to maintain a constant speed ratio between them. Preferably, an extended shaft is constantly rotated and the auxiliary frequency changers are connected to the rotating shaft by any suitable speed-changing devices, whereby the auxiliary frequency changers may be conveniently rotated at any desired speed ratio. An induction motor is associated with each set of rolls, and a frequency changer is provided which is common to all the sets of rolls. The windings of each of said induction motors are severally energized by the common frequency changer and the associated auxiliary frequency changer. The induction motor governs a motor-operated rheostat which controls the excitation of the motor propelling the associated set of rolls. Thus, the propelling motors for the sets of rolls are operated to maintain any desired speed ratio between the sets of rolls.

Each rheostat motor comprises two differentially-related field-magnet windings which are selectively operated by the associated induction motor, operating as an electric differential means, to control the rheostat to govern the excitation of the associated propelling motor. The induction motor is frictionally connected to a disk member which controls two sets of contact members according to the direction of rotation of the motor. The two sets of contact members energize the one or the other of said field-magnet windings, in series with the motor armature, to operate the rheostat. Two electromagnets are connected in parallel-circuit relation to the energized field-magnet winding and the motor armature, according to the desired direction of rotation of said motor. Each of said magnets is connected to the frictionally-operated disk by a pin-and-slot connection in order to return the disk and the sets of contact members to the initial position when the rheostat motor has been operated. Unless some further means were provided to prevent operation of the electromagnet under certain operating conditions of the induction motor, the rheostat motor would always be operated in a step-by-step manner. Accordingly, a contact arm is frictionally connected to the induction-motor shaft for preventing operation of the electromagnets when the motor is operating above a predetermined speed. Thus, the induction motor is operated in a forward and in a reverse direction to control a rheostat motor by means of the frictionally-operated disk and the sets of contact members. If the induction motor is rotated at a very low speed, the electromagnets are operated to effect a step-by-step adjustment of the speed of the motor for propelling the rolls. However, if the induction motor is operated at a relatively high speed, the electromagnets are prevented from operating until the motor for the rolls approaches normal speed.

In the accompanying drawing, Figure 1 is a diagrammatic view of a speed-regulator system embodying my invention; Fig. 2 is a diagrammatic view of a mechanism for operating the belt shifter shown in Fig. 1; Fig. 3 is a diagrammatic view of a system for operating the belt shifter shown in Fig. 2; and Figs. 4 and 5 are plan and side elevational views of the mechanism operated by the induction motor shown in Fig. 2, and Fig. 6 is a detail view of the contact arm controlled by the induction motor.

Referring to Fig. 1 of the drawings, a roll 1, which is assumed to be part of a set of rolls in a paper or a steel mill, is operated by a shunt-wound motor 2, and a similar roll 3 is operated by a motor 4. The motor 2 comprises a shunt field-magnet winding 5 and an armature 6 which is mechanically connected to the shaft 7 of the roll 1 in any convenient manner, as by means of gear wheels 8. The motor 4 comprises a shunt field-magnet winding 9 and an armature 10 which is connected to the shaft 11 of the roll 3 by means of gear wheels 12. The field-magnet winding 9 is connected in series with a motor-operated rheostat 13 and an adjustable resistor 14 across the terminals of the armature 10. A similar motor-operated rheostat (not shown) and an adjustable resistor (not shown) are provided in circuit with the field-magnet winding 5 of the motor 2.

A suitable direct-current generator 15 is provided for supplying energy to the propelling motors 2 and 4. The generator 15 comprises an armature 17, a series field-magnet winding 18 and a shunt field-magnet winding 19 which is connected in series with an adjustable resistor 20. The armature windings of the motors 2 and 4 are directly connected to the generator 15 and, accordingly, the speed of such motors may be controlled by varying the voltage produced by the generator. Thus, the speeds of motors 2, 4 and 16 (hereinafter described) may be simultaneously controlled by varying the resistor 20.

A frequency changer 21, comprising a primary winding 22 and a secondary winding 23, is associated with the set of rolls including the roll 1, and a similar frequency changer 28, comprising a primary winding 24 and a secondary winding 25, is associated with the set of rolls including the roll 3. The primary windings 22 and 24 are electrically connected to any suitable three-phase supply circuit. The secondary winding 23 is mechanically connected to the shaft 7 of the roll 1 by gear wheels 26, and the secondary winding 25 is mechanically connected to the shaft 11 of the roll 3 by gear wheels 27.

An auxiliary frequency changer 29 is associated with the propelling motor 4, and an auxiliary frequency changer 30 is associated with the propelling motor 2. The frequency changer 29 comprises a primary winding 31 which is connected to the secondary winding of the frequency changer 28 and a secondary winding 32 which is mechanically connected to a propelling shaft 33 by means of a speed-changing device 34. The auxiliary frequency changer 30 comprises a primary winding 35 which is directly connected to the secondary winding 23 of the frequency changer 21 and a secondary winding 36 on a rotor which is mechanically connected to the shaft 33 by a suitable speed-changing device 37. A motor 38 is provided for rotating the shaft 33 at any desired speed. The motor 38 comprises a field-magnet winding 39 and an armature 40. A resistor 41 is connected in circuit with the field-magnet winding 39 for adjusting the speed of the motor. The armature 40 is mechanically connected to the shaft 33 by suitable gear wheels 42.

The speed-changing device 34, which connects the frequency changer 29 to the shaft 33, embodies a cone pulley 43 which is mounted upon the shaft 33 or is rotated at a speed corresponding to the speed of the shaft 33 and a similar cone pulley 44 which is mounted upon, or is connected to, the shaft carrying the secondary winding 32 of the frequency changer 29. A belt 45 is provided for connecting the two cone pulleys, and electrically-operated means is provided for varying the position of the belt along the shaft to vary the speed of the auxiliary frequency changer 29 relative to the speed of the driving shaft 33.

The means for shifting the belt along the cone pulleys is best shown in Fig. 2, and comprises an arm 46, having a bifurcated end portion 47 which engages the belt 45, and a threaded portion 48 which is mounted upon a worm shaft 49. The worm shaft 49 is provided with bearings 50 and a propelling ratchet wheel 51 which is operated by two electromagnets 52 and 53. The electromagnet 52 is operated by a push-button switch 54 from a battery 55 to increase the speed of the auxiliary frequency changer 29, and the electromagnet 53 is operated by a push-button switch 56 from the battery 55 to decrease the speed of the auxiliary frequency changer 29. The armature 57 of the electromagnet 52 is pivoted at 58 and is retracted by means of a spring 59. A latch 60 is pivotally connected to the armature 57 and serves to engage the teeth of the ratchet wheel 51 for rotating the worm shaft 49 in a counter-clockwise direction.

When the worm shaft 49 is rotated in a counter-clockwise direction, the arm 46 is shifted toward the left, as shown in Fig. 1 of the drawing, to increase the speed of rotation of the auxiliary frequency changer 29. The electromagnet 53 operates a latch member 61 for rotating the worm 49 in a clockwise direction to decrease the speed of rotation of the auxiliary frequency changer 29.

A centering device 62 is provided for locking the ratchet wheel 51 and the worm shaft 49 against operation when the magnets 52 and 53 are de-energized. The centering or locking device comprises an armature 63 which is held in engagement with the teeth of the rachet wheel 51 by means of a spring 64 when the magnets 52 and 53 are de-energized. A coil 65 serves to remove the armature 63 from engagement with the teeth of the ratchet wheel 51 when either the magnet 52 or the magnet 53 is energized. Thus, the speed of the auxiliary frequency changer 29 may be increased by operating the push button 54 and may be decreased by operating the push button 56, the centering device 62 serving to prevent any change in the speed of the auxiliary frequency changer when the push buttons 54 and 56 are released.

The speed-changing mechanism for varying the speed of the auxiliary frequency changer 30 relative to the speed of the driving shaft 33 is similar in construction and operation to the speed-changing device 34 and, accordingly, a detailed description of the construction and operation of the speed-changing device 37 is deemed unnecessary. In like manner, any number of auxiliary frequency changers may be connected to the rotating shaft 33 for controlling the operation of a like number of sets of rolls.

The motor 16 comprises an armature 66 and a field-magnet winding 67 which is connected, in series with an adjustable resistor 68, across the armature 66. The motor 16 serves to operate a common frequency changer 69 in any suitable manner, as by means of a shaft 70. The frequency changer 69 comprises a primary winding 71, which is energized from the source connected to the windings 22 and 24, and a secondary winding 72. The speed of the common frequency changer 69 and, accordingly, the frequency produced by it, is varied by changing the adjustable resistor 68. The frequency changer 69 is common to all sets of rolls, and the function performed by it will be set forth in detail hereinafter.

An induction motor 73 is associated with the propelling motor 4, and an induction motor 74 is associated with the propelling motor 2. The induction motor 73 embodies a primary winding 75, which is directly connected to the secondary winding 32 of the auxiliary frequency changer 29, and a secondary winding 76, which is directly connected to the secondary winding 72 of the common frequency changer 69. Thus, it is apparent that the speed of the induction motor 73 and the direction of its rotation are controlled by the current frequencies developed by the auxiliary frequency changer 29 and the common frequency changer 69.

The induction motor 73 serves to control a motor 77 for governing the operation of the rheostat 13. The motor 77 comprises two differentially-related field-magnet windings 78 and 79 and an armature 80 which is mechanically connected to the arm 81 of the rheostat 13 by any suitable worm gearing 82.

A disk 83 is frictionally connected to the shaft 84 of the induction motor 73 and serves to govern the operation of two contact arms 85 and 86 (Fig. 5) in accordance with the direction of rotation of the motor 73. The disk 83 is loosely mounted upon the shaft 84 and is disposed between two collar members 87 and 88 (Fig. 4). The collar member 87 is rigidly connected to the motor shaft 84, in any suitable manner, as by means of pins 89. A pin 90 projects from the collar member 87 into a slot which is cut in the collar member 88. Thus, the collar members 87 and 88 are rotated with the shaft 84, and the collar member 88 is free to move longitudinally along the shaft 84. The end portion of the collar member 87 is provided with threads 91 upon which are mounted a nut 92 and a locking nut 93. A washer 94 is disposed adjacent to the nut 92 and a spring 95 is disposed between the washer 94 and the projecting portion 96 of the collar member 88. Thus, the spring 95 serves to hold the disk 83 in frictional engagement with the shaft 84 of the induction motor 73. Accordingly, the contact arms 85 and 86 are operated in accordance with the direction of rotation of the induction motor 73.

The contact arm 85 carries two contact members 97 and 98 which are respectively adapted to bridge the contact members 99 and 100. When the contact arm 85 is operated by the disk 83, the contact member 97 bridges the contact member 99 and then the contact member 98 bridges contact member 100. The contact members 97 and 98 are free to slide along the contact arm 85 and are respectively maintained in the position shown in Fig. 5 by means of springs 101 and 102. A spring 103 serves to return the arm 85 to initial position when released by the contact disk 83. The contact arm 86 is provided with two contact members 104 and 105 which respectively serve to bridge the contact members 106 and 107. The parts operated by the contact member 86 are similar in construction and operation to the parts operated by contact arm 85 and a detailed description of such construction and operation is therefore deemed unnecessary.

Two electromagnets 108 and 109 are provided for returning the disk 83 and the parts associated therewith to their respective normal or initial positions when the motor 77 has been operated. The electromagnet 108 comprises a coil 110 and an armature 111 which is maintained in retracted position by means of a spring 112. An extended end portion of the armature is provided with a stop member 113 for limiting the movement of the armature. An arm 114, having a slot 115, is connected to the armature 111 in any suitable manner, as by means of rivets. The electromagnet 109 is similar in construction and operation to the electromagnet 108 and comprises a coil 116, an armature 117 and an arm 118 which is connected to the armature 117. The arm 118 is provided with a slot 119 similar to the slot 115 which is formed in the arm 114.

A block 120, having a pin 121 mounted in it, is directly connected to the disk 83 in any suitable manner. The pin 121 projects through the slots 115 and 119 in the arms 114 and 118 and serves to operate the disk 83 in accordance with the operation of the electromagnets 108 and 109. The pin-and-slot connection between the electromagnets 108 and 109 serves to return the disk 83 to an initial or normal position, as shown in Fig. 5, when the electromagnets are operated.

As shown in Fig. 1, the contact members 97 and 98 serve to connect the field-magnet winding 78 and the armature 80 of the motor 77 to a suitable source of current 122. The contact members 104 and 105 serve to connect the field-magnet winding 79 in series with the armature 80 to the source of current 122. The coils 110 and 116 of the electromagnets 108 and 109 are connected in parallel relation to the armature 80 and accordingly are practically simultaneously energized with the rheostat pilot motor. The rheostat 13 is controlled by the motor 77 to adjust the excitation of the propelling motor 4 and, accordingly, to control the speed of the roll 3. The hand-operated resistor 14 may be operated independently of the rheostat 13 to adjust the speed of the motor 4 and that of the roll 3. Thus, the induction motor 73 is jointly controlled by the common frequency changer 69 and the auxiliary frequency changer 29 to govern the speed of the propelling motor 4.

In case the induction motor 73 is operating at a relatively high speed in order to effect considerable change in the speed of the propelling motor 4, a contact arm 123 is operated to hold the circuits of the coils 110 and 116 open until the speed of the motor 4 is near normal value and the speed of the induction motor 73 is lowered. The contact arm 123 is frictionally connected to the shaft 84 of the induction motor 73 and is biased to an initial or central position by springs 124. The contact arm 123 carries a contact member 125 which engages contact member 126 when the arm is in a central position as shown in Fig. 1. The coils 110 and 116 are connected in series with the contact members 125 and 126 so that the coils are de-energized whenever the contact members are separated.

As shown in Fig. 4, the frictional connection between the arm 123 and the shaft 84 comprises a casing 127 which is screwed upon the end portion of the collar 87 adjacent to the locking nut 93. Annular disks 128 are connected to the casing 127 in any suitable manner, as by means of screws 129. Adjacent to, and between, the annular disks 128 are disposed annular disks 130 which are mounted upon a collar 131. The collar 131 is free to rotate on the motor shaft but is prevented from having axial movement along the shaft by means of screws 132 which project into a groove 133 formed in said shaft. The contact arm 123 is rigidly connected to the collar 131, and a viscous material, such as heavy oil, is disposed within the casing 127. A cap 134 is screwed into the casing 127 for holding the viscous material in position between the annular disks 128 and 130. Thus, the viscous material between the annular disks 130 and 128 serves to effect a frictional engagement between the contact arm 123 and the motor shaft 84, and the contact arm 123 operates in accordance with the speed of the induction motor 73. If the induction motor is operating above a predetermined speed, the contact arm 123 is operated to open the circuit of the coils 110 and 116 for permitting the motor 77 to operate until the propelling motor 4 is returned to approximately normal speed. When the motor 4 is near normal speed, the rheostat motor 77 is operated in a step-by-step manner by the electromagnets 108 and 109.

The induction motor 74, which is associated with the propelling motor 2, is provided with a primary winding 136 which is directly connected to the secondary winding 36 of the auxiliary frequency changer 30, and a secondary winding 137 which is directly connected to the secondary winding 72 of the common frequency changer 69. Since the induction motor 74 operates in a manner similar to the induction motor 73 for controlling the excitation of the field-magnet winding 5 of the motor 2, a complete description of the operation of such induction motor in performing such function is deemed unnecessary.

Assuming the auxiliary frequency changers 29 and 30 and the common frequency changer 69 to be adjusted for maintaining any desired ratio of speed between the propelling motor 2 and the propelling motor 4, and the speed of the propelling motor 4 to be increased above normal value; upon increase in the speed of the motor 4 and the roll 3, the speed of the associated frequency changer 28 is changed to increase the frequency of the current that is supplied to the primary winding 31 of the associated auxiliary frequency changer 29. Thereupon, the frequency of the current supplied by the frequency changer 29 to the primary winding 75 is increased, and the induction motor 73 is energized to operate the contact members 104 and 105. The field-magnet winding 79 and the armature 80 are connected to the source of current 122, and the rheostat motor 77 is operated in a counter-clockwise direction. The rheostat arm 81 is operated in a clockwise direction to reduce the resistance value of the resistor 13, which is included in circuit with the field-magnet winding 9, to reduce the speed of the propelling motor 4. When the motor 77 is energized from the source of current 122, the coils 110 and 116 of the electromagnets 108 and 109 are energized to return the disk 83 to normal position and, accordingly, to break the circuit of the motor 77. If the motor 4 is not returned to normal speed by the first operation, the disk 83 is again operated by the induction motor 73 for effecting further change in the excitation of the motor 4. Such step-by-step operation is continued until the speed of the motor 4 is returned to normal value. In case the speed of the motor 4 is relatively high, the contact arm 123 is operated, as above set forth, to prevent operation of the magnets 108 and 109 until the motor 4 is somewhat nearer the desired speed.

If the speed of the motor 4 is below normal value, the associated frequency changer 28 is operated at a reduced speed and, accordingly, furnishes a lower-frequency current to the auxiliary frequency changer 29. In turn, the auxiliary frequency changer 29 supplies a lower-frequency current to the primary winding 75 of the induction motor 73. The induction motor operates the disk 83 and the contact arm 85 to complete a circuit from the source of current 122 through the field-magnet winding 78 and the armature 80. The rheostat motor 77 is operated in a clockwise direction to effect rotation of the rheostat arm 81 in a counter-clockwise direction. Thus, the resistance value of the rheostat 13, which is included in circuit with the field-magnet winding 9, is increased to increase the speed of the motor 4.

In a similar manner, the motor 2 of the roll 1 is controlled by the induction motor 74 and, in like manner, any number of sets of rolls may be similarly controlled. In case it is desired to change the speed of all rolls without changing the speed ratio between them, the rheostat 20 is varied to change the voltage of the current which is supplied to the various propelling motors. If it is desired to change the speed ratio between the various sets of rolls, such change may be effected by varying the speed-changing devices which connect the auxiliary frequency changer to the constantly rotating shaft 33.

Modifications in the system and in the arrangement and location of parts may be made within the spirit and scope of my invention, and such modifications are intended to be covered by the appended claims.

I claim as my invention:

1. In a regulator system, the combination with a plurality of rotating members, a plurality of auxiliary dynamo-electric machines energized in accordance with the speeds of said rotating members, a rotating element for all of said machines, and an auxiliary dynamo-electric machine common to all rotating members, of means jointly controlled by one of said auxiliary dynamo-electric machines and the common dynamo-electric machine for governing the speed of each rotating member.

2. In a speed-regulator system, the combination with a plurality of rolls, a propelling motor for each of said rolls, a plurality of auxiliary frequency changers energized in accordance with the speeds of said rolls having a common operating element therefor, and a frequency changer common to all of said propelling motors, of an induction motor associated with each roll and jointly controlled by the common frequency changer and one of said auxiliary frequency changers, and means controlled by said induction motor for controlling the excitation of the associated propelling motor to govern the speed of the roll operated by it.

3. In a speed-regulator system, the combination with a plurality of rotating members, a propelling motor for each of said members, a frequency changer common to all of said members, and a plurality of auxiliary frequency changers having a common operating element, of means controlled by the common frequency changer and one of the auxiliary frequency changers for governing the operation of each propelling motor.

4. In a speed-regulator system, the combination with a plurality of rotating members, a propelling motor for each of said members, a plurality of auxiliary frequency changers, a rotating element for operating all of the auxiliary frequency changers at a constant speed ratio, means for varying the speed of each auxiliary frequency changer to vary said speed ratio, and a frequency changer common to all of said rotating members, of an induction motor associated with each of said rotating members, the induction motor associated with each member being jointly controlled by the common frequency changer and one auxiliary frequency changer, and a motor-operated rheostat controlled by each induction motor for governing the excitation of the motor propelling the associated rotating member.

5. In a speed-regulator system, the combination with an induction motor, a disk frictionally connected to the rotor of said motor and normally in an inoperative position, and contact members operated by the disk when the motor is operated in a forward and in a reverse direction thus moving said disk from its inoperative position, of a rheostat motor having differentially-related field-magnet windings controlled by said contact members and means comprising electromagnets connected in parallel-circuit relation to said rheostat motor and serving to return the disk to normal position.

6. In a speed-regulator system, the combination with a motor and contact members operated by said motor said contacts normally being in an inoperative position, of a rheostat motor having differentially-related field-magnet windings controlled by said contact members, and means comprising electromagnets connected in parallel-circuit relation to said rheostat motor and serving to return the contact members to normal position.

7. In a control system, the combination comprising a motor having differentially-related field-magnet windings, contact members for controlling said motor, and means comprising electromagnets for returning the contact member to initial position a predetermined time after operation of the motor, each electromagnet being connected in parallel-circuit relation to the armature of said motor.

8. In a control system, the combination with a control motor, and two sets of contact members and a contact arm frictionally operated by said motor, of an auxiliary motor having two differentially-related field-magnet windings, means comprising two electromagnets respectively serving to return the two sets of contact members to initial position, means for operating said magnets in accordance with the energization of said field-magnet windings, and means controlled by said contact arm for preventing the operation of said magnets when the control motor is operating above a predetermined speed.

9. In a control system, the combination with a motor, two sets of contact members frictionally controlled by said motor, and a contact arm controlled by said motor, of means comprising electromagnets for returning said contact members to open position after operation by said motor, and means controlled by said contact arm for preventing operation of the electromagnets if the motor is operating above a predetermined speed.

10. In a control system, the combination with a main motor, two sets of contact members respectively operated when said motor is operated in a forward and in a reverse direction, and a contact arm frictionally controlled by said motor and operated when the motor is rotated above a predetermined speed, of an auxiliary motor having an armature and two differentially-related field-magnet windings, said sets of contact members serving to selectively connect the armature in series with one of said field-magnet windings across a supply circuit, an electromagnet connected in shunt-circuit relation to said armature, a second electromagnet connected in shunt-circuit relation to the other field-magnet winding and said armature, said electromagnets comprising means serving to return the contact members to open position, and means controlled by said contact arm for preventing the operation of the electromagnets if the main motor is operating above a predetermined speed.

11. In a control system, the combination with a motor, a contact disk, means for frictionally connecting the disk to the shaft of the motor, and contact members operated by said disk in accordance with the direction of rotation of said motor, of electromagnets, means for operating said electromagnets in accordance with the operation of said contact members, and pin-and-slot connections between said disk and the magnets for returning the disk to initial position upon operation of the electromagnets.

12. In a control system, the combination with a motor, a contact disk frictionally connected to the shaft of said motor, two sets of contact members operated by said disk, and a contact arm frictionally connected to the shaft of said motor, of two electromagnets controlled by said contact members, means controlled by said electromagnets for returning said disk to initial position, and means controlled by said contact arm for preventing operation of the electromagnets if the motor is operating above a predetermined speed.

13. In a control system, the combination with a motor, a contact disk frictionally connected to the motor shaft, contact members operated by said disk, and means controlled by the contact members for returning the disk to initial position, of a contact arm controlled by said motor for preventing the operation of said means if the motor is operating above a predetermined speed.

14. In a control system, the combination with a motor, contact members frictionally controlled by said motor, and a contact arm controlled by said motor, of means controlled by the contact members for returning them to initial position within a predetermined period of time after they are operated, and means controlled by said contact arm to prevent the returning of the contact members to initial position if the motor is operating above a predetermined speed.

15. In a control system, the combination with a motor, and movable contact members and a contact arm controlled by said motor, of control means comprising electromagnets operating a predetermined time after the contact members for returning them to initial position, and means controlled by the contact arm for preventing the operation of said control means if the motor is operating above a predetermined speed.

16. In a control system, the combination with a motor, means for operating the motor in a clockwise and in a counter-clockwise direction, and contact members operated in accordance with the direction of rotation of the motor, of control means for returning said contact members to initial position, and means for preventing the operation of said control means if the motor is operating above a predetermined speed.

17. In a control system, the combination with a dynamo-electric machine, a pair of contact arms, contact members carried by said arms, and springs for biasing the contact arms to retracted positions, of a motor and a disk frictionally connected to said motor for operating the contact arms according to the direction of rotation of the motor to govern the operation of said machine.

18. In a speed-regulator system, the combination with a plurality of rotating members, a propelling motor for each of said members, a plurality of auxiliary frequency changers having a common operating means therefor, a frequency changer common to all of said rotating members and a motor-operated rheostat associated with each of said propelling motors, of a plurality of differentials jointly controlled by said frequency changers and adapted to govern the actions of the motor-operated rheostats.

19. In a regulator system, the combination comprising a plurality of rotating members, speed-changing devices associated therewith having a common operating means, a frequency changer operated by each of said devices, an auxiliary frequency changer and means for controlling the speed of each rotating member, said means being jointly controlled by the auxiliary frequency changer and the frequency changer associated with each rotating member.

20. In an electrical system, the combination with a plurality of dynamo-electric machines operating at a constant-speed ratio, said machines having a common operating means, and a dynamo-electric machine common to the first-mentioned machines, of means controlled by said dynamo-electric machines for governing the first-mentioned machines having a normal step-by-step operation, and control means for rendering ineffective said normal operation.

21. In an electrical system, the combination with a plurality of dynamo-electric machines operating at a constant-speed ratio, said machines having a common operating means, and a dynamo-electric machine common to the first-mentioned machines, of means controlled by said dynamo-electric machines for governing the first-mentioned machines having a normal step-by-step operation, and means responsive to the rate of speed change of said control means for interrupting said normal operation.

22. In an electrical system, the combination comprising a plurality of rotating members, speed-changing devices associated therewith having a common operating means, a frequency changer operated by each of said devices, an auxiliary frequency changer, means for controlling the speed of each rotating member, said means being jointly controlled by the auxiliary frequency changer and the frequency changer associated with each rotating member and having a normal step-by-step operation, and control means for rendering ineffective said normal operation.

23. In an electrical system, the combination comprising a plurality of rotating members, speed-changing devices associated therewith having a common operating means, a frequency changer operated by each of said devices, an auxiliary frequency changer, means for controlling the speed of each rotating member, said means being jointly controlled by the auxiliary frequency changer and the frequency changer associated with each rotating member and having a normal step-by-step operation, and means responsive to the rate of speed change of said control means for interrupting said normal operation.

24. In a speed-regulator system, the combination with a motor, a disk connected to the rotor of said motor and actuating contact members operated in accordance with the forward or the reverse movement of said rotor, a rheostat motor having differentially-related field-magnet windings respectively controlled by said contact members, and electromagnets connected in parallel-circuit relation to said rheostat motor and adapted to return said disk to normal position, and means responsive to the rate of speed change of said motor for rendering said electromagnets ineffective.

25. In an electrical system, the combination comprising a dynamo-electric machine adapted for forward and reverse operation, contact means controlled by said motor, electromagnets for returning the contact means to a neutral position a predetermined time after operation of the motor, and means responsive to the rate of speed change of said machine for rendering said electromagnets ineffective.

26. In an electrical system, the combination with a control motor, of an auxiliary motor having differentially-related field magnet windings energized in accordance with the operation of said control motor, electroresponsive means adapted to periodically de-energize said auxiliary motor, and means responsive to the rate of speed change of said control motor for rendering said electroresponsive means ineffective.

27. In an electrical system, the combination with a motor, control means comprising a switch lever connected to the shaft of the motor and switch terminals co-operating therewith and adapted to be engaged in accordance with the direction of rotation of said motor, of other control means comprising a switch lever operated in accordance with the speed of the motor and adapted to render the first-named control means ineffective under predetermined conditions.

28. In a speed-regulating system, the combination with a rotatable member, a motor for propelling said member, and means including a motor-operated rheostat for varying the excitation of said motor to maintain the speed thereof substantially constant, of regulating means for normally effecting a step-by-step operation of the rheostat and means for rendering the normal operation of said rheostat ineffective under predetermined conditions.

29. In a regulator system, an electric differential, means controlled thereby, and regulating means controlled in accordance with the operation of said differential, said means being adapted to accelerate the action of said regulating means under predetermined conditions.

30. In a regulator system, the combination with a plurality of rotatable members and a propelling motor for each of said members, of means for controlling said propelling motors to maintain a constant-speed ratio between said rotating members and comprising a plurality of auxiliary members also adapted to operate at a constant-speed ratio and means for accelerating the action of said first-mentioned means.

31. In an electrical system, the combination with a plurality of dynamo-electric machines operating at a constant-speed ratio, said machines having a common operating means, and a dynamo-electric machine common to the first-mentioned machines, of means controlled by said dynamo-electric machines for governing the first-mentioned machines, and means responsive to the rate of speed changing thereof for accelerating the action of said control means.

32. In an electrical system, the combination with a plurality of dynamo-electric machines having a common operating means therefor and a dynamo-electric machine common to said first-mentioned machines, of a plurality of electric differentials associated with said machines for governing the speeds of the first-mentioned machines, and means responsive to the rates of movement of said differentials for accelerating said governing action.

33. In a control system, the combination with a motor, a disk, means for frictionally connecting the disk to the shaft of the motor, and contact members operated by said disk in accordance with the direction of rotation of said motor, of electromagnets, means for operating said electromagnets in accordance with the operation of said contact members, pin-and-slot connections between said disk and the electromagnets for returning the disk to initial position upon operation of the electromagnets, and means for interrupting the action of said electromagnets.

34. In an electrical system, the combination with a dynamo-electric machine, a contact arm actuated by the shaft of said machine, contact members operated thereby, and a second contact arm actuated by the shaft of said machine, of electro-responsive means having co-operating therewith means for returning one of said arms to an initial position after the same has been operated, and means for preventing the operation of the electro-responsive means if the machine is operating above a predetermined speed.

35. In a regulator system, the combination with a plurality of dynamo-electric machines operating at a constant-speed ratio and a dynamo-electric machine common to, and electrically associated with, the first-mentioned machines, of means controlled by said dynamo-electric machines for governing the first-mentioned machines.

36. In a regulator system, the combination with a plurality of dynamo-electric machines operating at a constant-speed ratio and a dynamo-electric machine common to, and electrically associated with, said first-mentioned machines, of an electric differential associated with said machines for governing the speed of the first-mentioned machines.

In testimony whereof, I have hereunto subscribed my name this 5th day of January 1920.

STEPHEN A. STAEGE.